(No Model.)
H. G. COLEMAN.
TETHER.
No. 336,295. Patented Feb. 16, 1886.
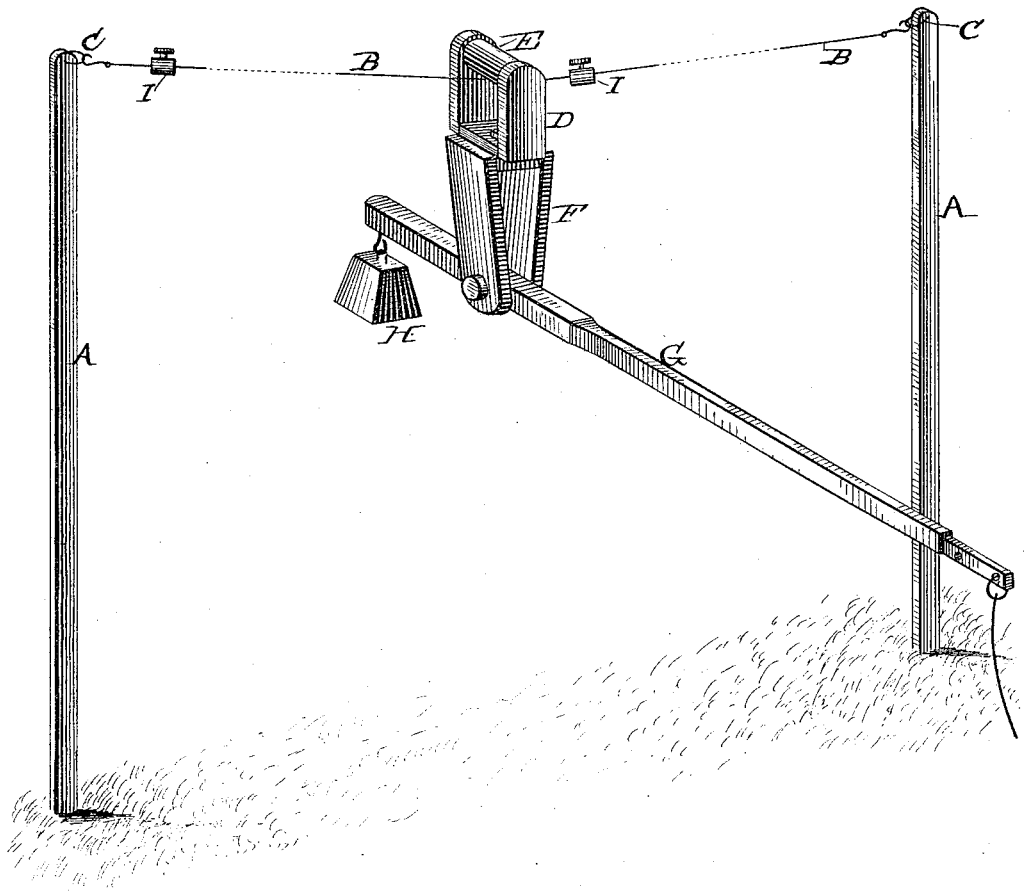
Witnesses
B. C. Fenwick
W. Allan
Inventor:
Henry Gordon Coleman
By his attorney
Chas. J. Gooch.

UNITED STATES PATENT OFFICE.

HENRY GORDON COLEMAN, OF GORDONTON, NORTH CAROLINA.

TETHER.

SPECIFICATION forming part of Letters Patent No. 336,295, dated February 16, 1886.

Application filed September 15, 1885. Serial No. 177,191. (No model.)

*To all whom it may concern:*

Be it known that I, HENRY GORDON COLEMAN, a citizen of the United States of America, residing at Gordonton, in the county of Person and State of North Carolina, have invented certain new and useful Improvements in Tethers; and I do hereby declare the following to be a full, clear, and exact description of the invention, such as will enable others skilled in the art to which it appertains to make and use the same, reference being had to the accompanying drawings, and to the letters of reference marked thereon, which form a part of this specification.

My improved tether is adapted for use in fields of varied size.

It consists of two posts or uprights connected together by a rope or wire upon which is mounted a link or eye having at its upper end a spool or roller to facilitate the movement of said link or eye along the rope or wire, and having at its lower end an eye swiveled thereto, and to which is pivotally or swivelly connected a lever or arm to which the animal is attached, said lever or arm being weighted at one end and at its other end having suitable means for attaching the animal thereto, adjustable spools upon the wireway limiting the movement therealong of the tethering device, all as hereinafter described.

The accompanying drawing is a perspective view of my tether as adapted for use.

A A represent the posts or uprights, which at their lower ends are inserted in the ground. These posts are at their upper ends connected by a wire or rod, B, suitable hooks or eyes, C, being inserted in said posts to which the respective ends of the rod or wire are rigidly attached with capability of ready removal whenever it may be desired to either remove the tether from place to place or lay it aside for future use. The rod serves as a way along which the tethering device may slide.

D represents a link or eye having at its upper portion a spool or roller, E, to permit of said link and the parts connected therewith readily traveling along the rope or wire as the animal moves about. To the lower end of this link or eye is swiveled or pivotally connected another link or eye, F, within which is pivoted a lever or arm, G, to which the animal to be grazed is attached. One end of this lever or arm is weighted either by having a weight, H, attached thereto, as shown, or by making said arm heavier at that end by any of the well-known means. To the opposite end of said lever or arm a rope, chain, or equivalent device is attached for the purpose of hitching the animal thereto. The hitching end of this lever or arm is provided with holes, by means of which an additional length of lever or arm may be attached thereto whenever it may be desired to lengthen the sweep of said arm for the purpose of affording the animal an increased area of ground over which to graze.

I represents spools attached to the rod or wire by thumb-screws for the purpose of limiting the movement of the swiveled links or eyes along the wire or rod, so as to prevent the animal passing around either of the posts or uprights, thus confining the animal within circumscribed limits.

I am aware that it has already been proposed to construct tethers with an arm pivoted to a supporting-post, and having at one end a weight and at the other end a device for attaching the animal thereto, and that it has also been proposed to construct a tether with two supporting-posts connected by an adjustable line to which the tethering-bar is attached, and another with a weighted arm attached to the supporting-post by a chain. Such, however, I do not claim; but,

Having thus described my invention, what I claim is—

A portable tether consisting of removable posts, a wire or rod rigidly connected at its respective ends to said posts and serving as a way along which the tether slides, a link or eye having at its upper portion a spool or roller to rest upon and slide along said post-connecting wire, a link swivelly connected to the lower portion of said traveling link, spools adjustably attached to said rod or way to limit the movement along said way of the tethering device, and a lever or arm pivotally connected to the swiveled link and having a weighted rear end, and a rope, chain, or cord at its front end, substantially as and for the purpose set forth.

In testimony whereof I affix my signature in the presence of two witnesses.

HENRY GORDON COLEMAN.

Witnesses:
A. M. LONG,
D. W. BRADSHER.